United States Patent
Yamada et al.

(10) Patent No.: US 12,338,305 B2
(45) Date of Patent: Jun. 24, 2025

(54) WAX DISPERSANT AND THERMOPLASTIC RESIN COMPOSITION

(71) Applicant: NOF CORPORATION, Tokyo (JP)

(72) Inventors: Akihiro Yamada, Amagasaki (JP); Takeshi Yoshimura, Amagasaki (JP); Hiroyuki Ogi, Amagasaki (JP); Tatsuya Aono, Amagasaki (JP)

(73) Assignee: NOF CORPORATION, Tokyo (JP)

( * ) Notice: Subject to any disclaimer, the term of this patent is extended or adjusted under 35 U.S.C. 154(b) by 911 days.

(21) Appl. No.: 17/606,872

(22) PCT Filed: Jul. 7, 2020

(86) PCT No.: PCT/JP2020/026514
§ 371 (c)(1),
(2) Date: Oct. 27, 2021

(87) PCT Pub. No.: WO2021/006259
PCT Pub. Date: Jan. 14, 2021

(65) Prior Publication Data
US 2022/0213242 A1 Jul. 7, 2022

(30) Foreign Application Priority Data

Jul. 11, 2019 (JP) ................ 2019-129298

(51) Int. Cl.
| | |
|---|---|
| *C08F 212/08* | (2006.01) |
| *C08F 212/10* | (2006.01) |
| *C08L 25/06* | (2006.01) |
| *C08L 25/14* | (2006.01) |
| *C08L 91/06* | (2006.01) |

(52) U.S. Cl.
CPC .......... *C08F 212/08* (2013.01); *C08F 212/10* (2013.01); *C08L 25/06* (2013.01); *C08L 25/14* (2013.01); *C08L 91/06* (2013.01); *C08L 2205/03* (2013.01)

(58) Field of Classification Search
CPC .... C08F 212/08; C08F 212/10; C08F 220/18; C08F 212/00; C08F 220/1818; C08F 220/1804; C08F 220/06; C08F 220/44; C08L 25/06; C08L 25/14; C08L 91/06; C08L 2205/03; C08L 101/00; C08L 25/08; C08L 67/00; C08L 25/00; C08L 5/101; C08K 5/103; C08K 5/101
See application file for complete search history.

(56) References Cited

FOREIGN PATENT DOCUMENTS

| | | |
|---|---|---|
| JP | 2006-030299 A | 2/2006 |
| JP | 2006-301177 A | 11/2006 |
| JP | 2018-124419 A | 8/2018 |
| JP | 2019-060934 A | 4/2019 |

*Primary Examiner* — Angela C Scott
(74) *Attorney, Agent, or Firm* — WHDA, LLP

(57) ABSTRACT

An object is to provide a wax dispersant capable of improving the resin composition in the fluidity in a molten state, the transparency and the storage stability, when adding the wax to a thermoplastic resin. The wax dispersant is a copolymer (A) which has a copolymerization composition comprising structural units respectively derived from: an aromatic monomer (A1) within 40 to 94% by mass; a (meth)acrylic acid long chain alkyl ester (A2) represented by the formula (1) (an alcohol residue $R^2$ is C9 to C22 alkyl) within 5 to 40% by mass; and a (meth)acrylic acid alkyl ester (A3) represented by the formula (2) (an alcohol residue $R^4$ is C1 to C8 alkyl) within 1 to 20% by mass, and also has a weight average molecular weight within 3,000 to 50,000.

10 Claims, No Drawings

WAX DISPERSANT AND THERMOPLASTIC RESIN COMPOSITION

TECHNICAL FIELD

The present invention relates to a wax dispersant excellent in the effect of imparting dispersibility of a wax to a thermoplastic resin, and a thermoplastic resin composition using the wax dispersant.

BACKGROUND ART

A wax is added to a thermoplastic resin such as polyester, polycarbonate or polystyrene in order to improve releasability from a mold during molding processing so as to inhibit contamination of a mold, and to adjust physical properties such as softening property of a resin according to a thermal or mechanical load. As the wax, for example, a hydrocarbon wax, a fatty acid ester or the like is used. However, when the dispersion state of the wax in the thermoplastic resin is insufficient, not only some effects such as an improvement in releasability and an adjustment in resin physical properties becomes insufficient, but also a problem such as a decrease in transparency and an occurrence of blocking caused by a migration of the wax to the resin surface occurs.

In particular, as an application utilizing the function of the wax described above, there may be mentioned an electrophotographic toner made of a thermoplastic resin composition in which some components such as a wax or a colorant are blended into a thermoplastic resin. In general, in a resin composition for a toner, since the amount of wax added is large as compared with that in a molding processing application of a resin, a problem caused by a low dispersibility of a wax is more likely to occur, and various contrivances have been made.

Patent Literature 1 discloses that a wax modified product obtained by modifying a polyolefin wax with a vinyl monomer is used as a dispersant for a thermoplastic resin composition containing a polyester resin and a carnauba wax, thereby improving dispersibility of the wax in the thermoplastic resin. Similarly, Patent Literature 2, discloses that an acrylic resin composed of a specific monomer composition is used as a dispersant for a thermoplastic resin composition containing a polyester resin and a monoester wax.

However, although a certain degree of wax dispersion effect can be obtained by such an attempt as described above, there has been problems in some cases such that: even if a relatively large amount of a dispersant is used, the wax cannot be sufficiently finely dispersed; or the softening property can be improved but the storage stability becomes insufficient, and both characteristics cannot be achieved. Accordingly, it is not satisfactory enough.

CITATION LIST

Patent Literature 1: JP-A 2007-264621
Patent Literature 2: JP-A 2018-60056

SUMMARY OF INVENTION

Technical Problem

An object of the present invention is to provide a wax dispersant capable of improving fluidity of a resin composition in a molten state when the wax is added to a thermoplastic resin, as well as improving stability of the resin composition during a preservation time without lowering transparency of the resin composition.

Solution to Problem

As a result of investigating to solve the above problem, the present inventors have found that the above problem can be solved by using a polymer having a specific structure as a wax dispersant.

The present invention is as follows.

[1] A wax dispersant, which is a copolymer (A) having a copolymerization composition comprising a structural unit derived from an aromatic monomer (A1) within a range of 40 to 94% by mass, a structural unit derived from a (meth)acrylic acid long chain alkyl ester (A2) represented by the following general formula (1) within a range of 5 to 40% by mass, and a structural unit derived from a (meth)acrylic acid alkyl ester (A3) represented by the following general formula (2) within a range of 1 to 20% by mass on the basis of mass of the monomers before polymerization, and having a weight average molecular weight within a range of 3,000 to 50,000.

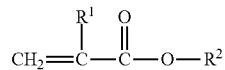

General Formula (1)

[In Formula (1), $R^1$ is hydrogen atom or methyl group, and $R^2$ is an alkyl group having 9 to 22 carbon atoms.]

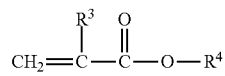

General Formula (2)

[In Formula (2), $R^3$ is hydrogen atom or methyl group, and $R^4$ is an alkyl group having 1 to 8 carbon atoms.]

[2] A thermoplastic resin composition comprising the wax dispersant defined by the above [1], a thermoplastic resin and a wax.

Advantageous Effects of Invention

By using the wax dispersant of the present invention, it is possible to improve the fluidity of the thermoplastic resin composition containing the wax in a molten state, as well as improve the stability of the thermoplastic resin composition during a preservation time, without lowering the transparency of the thermoplastic resin composition.

DESCRIPTION OF EMBODIMENTS

Embodiments of the present invention will be described below.

The wax dispersant of the present invention is a copolymer (A) having a copolymerization composition comprising a structural unit derived from an aromatic monomer (A1) within a range of 40 to 94% by mass, a structural unit derived from a (meth)acrylic acid long chain alkyl ester (A2) represented by the following general formula (1) within a range of 5 to 40% by mass, and a structural unit derived from a (meth)acrylic acid alkyl ester (A3) represented by the following general formula (2) within a range of 1 to 20% by mass on the basis of mass of monomers before polymerization, and having a weight average molecular weight within a range of 3,000 to 50,000.

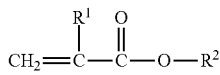

General Formula (1)

[In Formula (1), $R^1$ is hydrogen atom or methyl group, and $R^2$ is an alkyl group having 9 to 22 carbon atoms.]

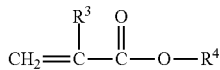

General Formula (2)

[In Formula (2), $R^3$ is hydrogen atom or methyl group, and $R^4$ is an alkyl group having 1 to 8 carbon atoms.]

Note that "(meth)acrylic" in the present invention is a generic term including acryl and methacryl.

In addition, the structural unit constituting the polymer means an unit having a chemical structure derived from a monomer used for synthesizing the polymer by a polymerization reaction and constituting a chain structure of a polymer chain.

In addition, the copolymerization ratio of the structural unit derived from each monomer on the basis of mass of the monomers before polymerization means the ratio of the mass of each the monomer which is incorporated into the copolymer with respect to the total mass of the monomers before polymerization which are incorporated into the copolymer by the polymerization reaction.

The copolymerization ratio of the structural unit derived from each monomer on the basis of mass of monomers before polymerization can be calculated from the charge amount of each monomer used in synthesizing the copolymer.

To calculate from the charge amount, when the polymerization conversion of the monomer at the time of synthesizing the copolymer is 100% (that is, the amount of the monomer remaining in the unreacted state is zero), it is considered that the amount of the monomer incorporated in the copolymer is equal to the charge amount of the monomer. On the other hand, when the polymerization conversion rate of the monomer at the time of synthesizing the copolymer is less than 100%, a calculated value obtained by subtracting the amount of the monomer remaining in the unreacted state from the charge amount of the monomer is considered to be an amount of the monomer incorporated in the copolymer.

First, the amount of each monomer incorporated in the copolymer is calculated from the charge amount of each monomer used for synthesizing the copolymer. Next, the total amount of monomers incorporated into the copolymer is calculated. Then, the ratio of each monomer incorporated in the copolymer to the total amount of monomers incorporated in the copolymer is calculated.

Further, as another method, the copolymerization ratio of the structural unit derived from each monomer on the basis of the mass of the monomers before polymerization can be determined from the result of analyzing the amount of the structural unit derived from each monomer present in the synthesized copolymer, by an appropriate method such as proton nuclear magnetic resonance spectroscopy or pyrolysis gas chromatography.

In this case, first, the amount of the structural unit derived from each monomer is measured or calculated from the analysis result of the copolymer. At this stage, usually, the amount of structural unit derived from each monomer is obtained as a value in mole unit. Next, the amount of the structural unit derived from each monomer is converted into the mass of the monomer before polymerization. Then, using the obtained conversion value, the ratio of each monomer incorporated in the copolymer with respect to the total amount of monomers incorporated in the copolymer is calculated.

[Aromatic Monomer (A1)]

The aromatic monomer (A1) used in the present invention is one having both an aromatic group and a polymerizable unsaturated group, and examples thereof include styrene, α-methylstyrene, p-methylstyrene, p-methoxystyrene, benzyl (meth)acrylate, and phenylmaleimide.

One kind of the monomer (A1) may be used alone, or 2 or more kinds thereof may be used in combination. From the viewpoint of polymerizability and compatibility with a thermoplastic resin, styrene and benzyl (meth)acrylate are preferred, and styrene is more preferred.

The copolymerization ratio of the structural unit derived from the aromatic monomer (A1), which occupies the structural unit constituting the copolymer (A), is 40 to 94% by mass, preferably 50 to 92% by mass, and more preferably 60 to 90% by mass, based on the mass of the monomers before polymerization. When the mass ratio of the aromatic monomer (A1) is lower than 40% by mass, the affinity to the thermoplastic resin becomes low, and when the mass ratio is higher than 94% by mass, the affinity to the wax becomes low.

[(Meth)Acrylic Acid Long Chain Alkyl Ester (A2)]

The (meth)acrylic acid long chain alkyl ester (A2) is represented by the following general formula (1).

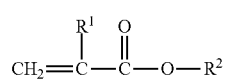

General Formula (1)

In Formula (1), $R^1$ is hydrogen atom or methyl group, and methyl group is preferred from the viewpoint of polymerizability.

$R^2$ is an alkyl group having 9 to 22 carbon atoms. The alkyl group having 9 to 22 carbon numbers includes, for example, nonyl group, decyl group, dodecyl group, stearyl group and the like. From the viewpoint of affinity to the wax, the number of carbon atoms of the alkyl group constituting $R^2$ is preferably 12 or more, more preferably 16 or more.

$R^2$ may be a branched alkyl group, but is preferably a linear alkyl group. In addition, when $R^2$ is a branched alkyl group, the number of carbon atoms of the main chain portion of $R^2$ is preferably 9 or more.

One kind of the (meth)acrylic acid long chain alkyl ester (A2) may be used alone, or 2 or more kinds thereof may be used in combination.

The copolymerization ratio of the structural unit derived from the (meth)acrylic acid long chain alkyl ester (A2), which occupies the structural unit constituting the copolymer (A), is 5 to 40% by mass, preferably 6 to 38% by mass, and more preferably 7 to 30% by mass, based on the mass of the monomers before polymerization. When the mass ratio of the (meth)acrylic acid long chain alkyl ester (A2) is lower than 5% by mass, the affinity to the wax becomes lower, and when the mass ratio is higher than 40% by mass, the affinity to the thermoplastic resin becomes lower.

[(Meth)Acrylic Acid Alkyl Ester (A3)]

The (meth)acrylic acid alkyl ester (A3) is represented by the following general formula (2).

General Formula (2)

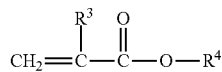

In Formula (2), $R^3$ is hydrogen atom or methyl group, and methyl group is preferred from the viewpoint of polymerizability.

$R^4$ is an alkyl group having 1 to 8 carbon atoms. The alkyl groups having 1 to 8 carbon atoms includes, for example, methyl group, ethyl group, propyl group, isopropyl group, n-butyl group, isobutyl group, tert-butyl group, n-hexyl group and 2-ethylhexyl group. The number of carbon atoms of the alkyl group constituting $R^4$ is preferably 2 to 6, more preferably 3 or 4, and still more preferably 4. By setting the number of carbon atoms of the alkyl group within this range, dispersibility of the wax can be improved.

$R^4$ may be a branched alkyl group, but is preferably a linear alkyl group. In addition, when $R^4$ is a branched alkyl group, it is preferable that the number of carbon atoms of the main chain portion of $R^4$ is 2 to 6.

One kind of the (meth)acrylic acid alkyl ester (A3) may be used alone, or two or more kinds thereof may be used in combination.

The copolymerization ratio of the structural unit derived from the (meth)acrylic acid alkyl ester (A3), which occupies the structural unit constituting the copolymer (A), is 1 to 20% by mass, preferably 2 to 12% by mass, and more preferably 3 to 10% by mass, based on the mass of the monomer before polymerization. By setting within this range, dispersibility of the wax can be improved.

Further, from the viewpoint of melt viscosity of the obtained thermoplastic resin composition, it is preferable to use a monomer (a3-1) in which $R^3$ is hydrogen atom and a monomer (a3-2) in which $R^3$ is methyl group in combination. The ratio of (a3-1) with respect to the total amount of (a3-1) and (a3-2) [(a3-1)/{(a3-1)+(a3-2)}×100] is 1 to 99% by mass, preferably 50 to 90% by mass, and more preferably 60 to 80% by mass. By setting within the above range, the melt viscosity of the composition can be lowered, and the molding processability becomes good.

[Other Monomers]

The copolymer (A) of the present invention may be composed only of structural units derived from the aromatic monomer (A1), the (meth)acrylic acid long chain alkyl ester (A2) and the (meth)acrylic acid alkyl ester (A3). Alternatively, a structural unit derived from another monomer polymerizable with these monomers may be further contained in an amount of 30% by mass or less based on the mass of monomers before polymerization. The ratio of the other monomers is set to 30% by mass or less, but is more preferably 15% by mass or less, still more preferably 5% by mass or less, and it may be 0% by mass.

Examples of such other monomers include (meth)acrylic acid, acrylamide, and acrylonitrile. When (meth)acrylic acid is used as the other monomer, dispersibility of the wax in the thermoplastic resin can be further improved. Accordingly, it is preferable.

[Copolymer (A)]

The weight average molecular weight, the number average molecular weight, and the degree of dispersion of the copolymer (A) of the present invention can be determined in terms of polystyrene using gel permeation chromatography (GPC). The weight average molecular weight is from 3,000 to 50,000, preferably from 4,000 to 30,000, more preferably from 5,000 to 10,000. If the weight average molecular weight of the copolymer is too low, the storage stability when the copolymer is made into the thermoplastic resin composition may be insufficient, and if the weight average molecular weight is too high, the transparency when the copolymer is made into the thermoplastic resin composition may decrease.

The degree of dispersion [weight average molecular weight/number average molecular weight] of the copolymer (A) of the present invention is 1.5 to 4.0, and preferably 2.0 to 3.0 from the viewpoint of dispersibility.

[Method for Producing Copolymer]

Next, a method of producing the copolymer (A) of the present invention will be described.

The copolymer (A) can be obtained by radically polymerizing a monomer mixture containing at least the aromatic monomer (A1), the (meth)acrylic acid long chain alkyl ester (A2) and the (meth)acrylic acid alkyl ester (A3).

The polymerization can be carried out by a known method. For example, solution polymerization, suspension polymerization, emulsion polymerization, and the like may be mentioned, but solution polymerization or suspension polymerization is preferred in view of easy adjustment of the weight average molecular weight of the copolymer (A) within the range described above.

As the polymerization initiator, a known one can be used. Examples thereof include organic peroxides such as 1,1,3,3-tetramethylbutylperoxy-2-ethylhexanoate, and azo-based polymerization initiators such as 2,2'-azobisisobutyronitrile. Only one kind of these polymerization initiators may be used, and two or more kinds thereof may be used in combination.

The amount of the polymerization initiator to be used can be appropriately set depending on the combination of the monomers used, the reaction conditions, and the like.

Note that, when the polymerization initiator is charged, for example, the whole amount may be charged in a batch, or a part may be charged collectively and the remaining amount may be added dropwise, or a whole amount may be added dropwise. Further, when a polymerization initiator is added dropwise together with the monomer, control of the reaction becomes easy, and further, when a polymerization initiator is added even after dropping of the monomer, the residual monomer can be reduced, that is preferable.

As the polymerization solvent used in the solution polymerization, those in which the monomer and the polymerization initiator are dissolved can be used, and specific examples thereof include methanol, ethanol, 1-propanol, acetone, methyl ethyl ketone, and propylene glycol monomethyl ether.

The concentration of the monomer (total amount) in the polymerization solvent is preferably 10 to 60% by mass, particularly preferably 20 to 50% by mass. If the concentration of the monomer mixture is too low, the monomer is likely to remain, and the molecular weight of the obtained copolymer may decrease, and if the concentration of the monomer is too high, control of the heat generation may be difficult.

When a monomer is charged, for example, a whole amount may be charged in a batch, or a part may be charged collectively and the remaining amount may be added dropwise, or a whole amount may be added dropwise. In view of making the control of heat generation easy, it is preferable that a part is charged collectively and the remaining amount is added dropwise, or a whole amount is added dropwise.

The polymerization temperature depends on the type of polymerization solvent and the like, and is, for example, 50° C. to 110° C. The polymerization time depends on the type of the polymerization initiator and the polymerization temperature, and for example, when a 1,1,3,3-tetramethyl-butylperoxy-2-ethylhexanoate is used as the polymerization initiator and the polymerization temperature is set to 90° C., a suitable polymerization time is about 6 hours.

By carrying out the above polymerization reaction, the copolymer (A) which is an effective component of the wax dispersant of the present invention is obtained. The obtained copolymer (A) may be used as it is, or may be isolated by subjecting the reaction solution after the polymerization reaction to solvent removal, filtration, or purification.

[Thermoplastic Resin Composition]

The polymer (A) of the present invention is suitably used as a dispersant of the wax into the thermoplastic resin. When the polymer (A) is coexisted together with the wax in the thermoplastic resin, the wax can be finely dispersed in the matrix of the thermoplastic resin, so that the fluidity of the resin composition in a molten state is improved, as well as the transparency of the resin composition is not lowered and an excellent appearance is provided, and further, the dispersion stability of the wax is improved and the stability of the resin composition during the preservation time is also improved.

The thermoplastic resin composition of the present invention comprises the copolymer (A) of the present invention as the wax dispersant together with the thermoplastic resin and the wax.

Examples of such thermoplastic resin include polyolefin resins such as polyethylene and polypropylene, acrylic resins such as poly(methyl methacrylate) and poly(butyl acrylate), rubbery (co)polymers such as polybutadiene and polyisoprene, polystyrene resins such as polystyrene, acrylonitrile/butadiene/styrene copolymer (ABS resin), polyester resins such as polyethylene terephthalate and polybutylene terephthalate, and polycarbonate resins. Of these, the acrylic resin, the polystyrene resin, and the polyester resin are preferred, and the polyester resin is more preferred.

Further, examples of the wax include a hydrocarbon-based compound, a fatty acid amide-based compound, and a fatty acid ester-based compound. These may be used alone or as a mixture of two or more thereof.

Examples of the hydrocarbon-based compound include liquid paraffin, paraffin wax, microwax, and polyethylene wax.

As the fatty acid amide-based compound, a monoamide or a bisamide of a fatty acid can be used, and examples thereof include capric acid amide, lauric acid amide, myristic acid amide, palmitic acid amide, stearic acid amide, erucic acid amide, methylene bis stearic acid amide, ethylene bis stearic acid amide, ethylene bis oleic acid amide, ethylene bis hydroxy stearic acid amide and the like.

Examples of the fatty acid ester-based compound include butyl stearate, butyl laurate, butyl palmitate, butyl montanite, propyl stearate, phenyl stearate, lauryl acetate, stearyl acetate, stearyl laurate, stearyl stearate, behenyl behenate, behenyl benzoate, glycerin tristearate, pentaerythritol tetrastearate, pentaerythritol tetrabehenate, glycerin dilaurate, glycerin monobehenate, pentaerythritol trilaurate, pentaerythritol distearate, pentaerythritol monobehenate and the like.

Among these, a fatty acid amide-based compound and a fatty acid ester-based compound are preferred, and a fatty acid ester-based compound is more preferred.

The content of the copolymer (A) of the present invention in the thermoplastic resin composition is preferably from 0.1 part by mass to 10.0 parts by mass, more preferably from 0.3 part by mass to 8.0 parts by mass, and still more preferably from 0.5 part by mass to 5.0 parts by mass, when the mass of the thermoplastic resin is 100 parts by mass. Further, the content of the wax in the thermoplastic resin composition is preferably from 0.1 part by mass to 10.0 parts by mass, more preferably from 0.5 part by mass to 8.0 parts by mass, and still more preferably from 1.0 part by mass to 5.0 parts by mass, when the mass of the thermoplastic resin is 100 parts by mass.

In the present invention, it is preferable that the melt flow rate (MFR) of the thermoplastic resin composition is 1.0 g/10 min or more and 15.0 g/10 min or less.

The melt flow rate (MFR) was measured under the condition of a load of 21.18N and a temperature of 150° C. in accordance with JIS K7210-1.

When the melt flow rate (MFR) of the thermoplastic resin composition is larger than 15.0 g/10 min, the strength of the thermoplastic resin composition may decrease. In addition, when the MFR is smaller than 1.0 g/10 min, the storage stability and processability of the thermoplastic resin composition may be deteriorated.

Depending on the purpose, the thermoplastic resin composition of the present invention may contain one or two or more of other components which impart desired characteristics, for example, a pigment, an antioxidant, a heat stabilizer, an ultraviolet absorber, and a plasticizer.

The thermoplastic resin composition of the present invention can be used as a raw material for the molding such as injection molding or blow molding, and as an electrophotographic toner.

EXAMPLES

Hereinafter, the present invention will be described in more detail my making reference to Examples and Comparative Examples.

1. Examples of Copolymer Production

Polymerization Example 1: Copolymer P1

A 1 L separable flask equipped with an agitator, a thermometer, a condenser, a dropping funnel and a nitrogen introducing pipe was charged with 370 g of toluene, and the inside of the flask was nitrogen-substituted to make the flask into a nitrogen atmosphere.

A monomer solution was prepared by mixing 272.8 g of styrene (product name: STYRENE Monomer, manufactured by NS STYRENE Co., Ltd.), 77.9 g of stearyl methacrylate (product name: BREMMER SMA, manufactured by NOF Co., Ltd.), 19.5 g of n-butyl acrylate (product name: BA, manufactured by Nippon Shokubai Co., Ltd.), 7.8 g of n-butyl methacrylate (product name: ACRYLESTER B, manufactured by Mitsubishi Chemical Co., Ltd.) and 11.7 g of methacrylic acid (product name: MAA, manufactured by Mitsubishi Chemical Corporation), and a initiator solution was prepared by mixing 20.7 g of t-butylperoxy-2-ethylhexanoate (product name: PERBUTYL-O, manufactured by NOF Co., Ltd.) and 20.0 g of toluene.

The temperature in the reaction vessel was raised to 105° C., and the monomer solution and the polymerization initiator solution were added dropwise at the same time over a period of 3 hours, respectively, and then reacted at 105° C. for 3 hours. After the reaction, toluene was distilled off under reduced pressure by the distilled amount of about 150 g. The content after distillation were dried under reduced pressure in a box-type vacuum dryer at 110° C. for 8 hours to obtain a copolymer P1.

Polymerization Example 2: Copolymer P2

A copolymer P2 was obtained by the same procedure as in Polymerization Example 1, except that the monomer solution was changed to another one containing 272.9 g of styrene, 78.0 g of stearyl methacrylate, 19.5 g of n-butyl acrylate and 19.5 g of n-butyl methacrylate.

Polymerization Example 3: Copolymer P3

A copolymer P3 was obtained by the same procedure as in Polymerization Example 1, except that the monomer solution was changed to another one containing 272.9 g of styrene, 78.0 g of stearyl methacrylate and 39.0 g of n-butyl methacrylate.

Polymerization Example 4: Copolymer P4

A 1 L separable flask equipped with an agitator, a thermometer, a condenser, a dropping funnel and a nitrogen introducing pipe was charged with 370 g of toluene, 272.9 g of styrene, 78.0 g of stearyl methacrylate, 39.0 g of n-butyl methacrylate and 5.7 g of t-butylperoxy-2-ethylhexanoate, and the inside of the flask was nitrogen-substituted to make a nitrogen atmosphere. The reaction vessel was gradually heated, and an internal temperature was raised up to 105° C., and the reaction was carried out at 105° C. for 3 hours. After the reaction, an operation of solvent removal was performed in the same manner as in Polymerization Example 1 to obtain a copolymer P4.

Polymerization Example 5: Copolymer P5

A copolymer P5 was obtained by the same procedure as in Polymerization Example 1, except that the monomer solution was changed to another one containing 195.0 g of benzyl methacrylate (product name: LIGHT ESTER Bz, Kyoeisha Chemical Co., Ltd.), 117.0 g of Stearyl Acrylate, 58.5 g of n-butyl acrylate and 19.5 g of acrylonitrile (product name: ACRYLONITRILE, manufactured by Mitsubishi Chemical Co., Ltd.).

Polymerization Example 6: Copolymer P6

A copolymer P6 was obtained by the same procedure as in Polymerization Example 1, except that the monomer solution was changed to another one containing 284.5 g of styrene, 58.5 g of stearyl methacrylate, 3.9 g of n-butyl acrylate, 3.9 g of n-butyl methacrylate and 39.0 g of methacrylic acid.

Polymerization Example 7: Copolymer P7

A copolymer P7 was obtained in the same manner as in Polymerization Example 1, except that the monomer solution was changed to another one containing 291.7 g of styrene, 77.8 g of stearyl acrylate and 19.4 g of acrylonitrile, and the polymerization initiator solution was changed to a mixture of 22.0 g of t-butylperoxy-2-ethylhexanoate and 20 g of toluene.

Polymerization Example 8: Copolymer P8

A copolymer P8 was obtained in the same manner as in Polymerization Example 1, except that the monomer solution was changed to another one containing 290.8 g of styrene, 77.6 g of n-butyl acrylate and 19.4 g of acrylonitrile, and the polymerization initiator solution was changed to a mixture of 10.0 g of t-butylperoxy-2-ethylhexanoate and 20 g of toluene.

[Measurement of Weight Average Molecular Weight and Degree of Dispersion of Copolymer]

Gel permeation chromatography (GPC) was used to determine the weight average molecular weight and degree of dispersion of copolymers P1 to P8 by the following conditions.

Equipment: HLC-8220, manufactured by Tosoh Corporation
Column: LF-804, manufactured by shodex
Standard material: polystyrene
Eluent: THF (tetrahydrofuran)
Flow rate: 1.0 ml/min
Column temperature: 40° C.
Detector: RI (differential refractive index detector)

The copolymerization composition, weight average molecular weight and degree of dispersion of the copolymers P1 to P8 are shown in Table 1. Copolymers P1 to P6 are the copolymers (A) of the present invention, and copolymers P7 and P8 are copolymers corresponding to Comparative Example. The copolymer P7 does not have a structural unit derived from the (meth)acrylic acid alkyl ester (A3) represented by the general formula (2). The copolymer P8 does not have a structural unit derived from the (meth)acrylic acid long chain alkyl ester (A2) represented by the general formula (1).

|  | P1 | P2 | P3 | P4 | P5 | P6 | P7 | P8 |
|---|---|---|---|---|---|---|---|---|
| Aromatic Monomer (A1) [mass %] | | | | | | | | |
| Styrene | 70 | 70 | 70 | 70 | | 73 | 75 | 75 |
| Benzyl Methacrylate | | | | | 50 | | | |
| (Meth)acrylic Acid Long Chain Alkyl Ester (A2) [mass %] | | | | | | | | |
| Stearyl Acrylate | | | | | 30 | | 20 | |
| Stearyl Methacrylate | 20 | 20 | 20 | 20 | | 15 | | |
| (Meth)acrylic Acid Alkyl Ester (A3) [mass %] | | | | | | | | |
| Butyl Acrylate (a3-1) | 5 | 5 | | | 15 | 1 | | 20 |
| Butyl Methacrylate (a3-2) | 2 | 5 | 10 | 10 | | 1 | | |

-continued

|  | P1 | P2 | P3 | P4 | P5 | P6 | P7 | P8 |
|---|---|---|---|---|---|---|---|---|
| Other [mass %] | | | | | | | | |
| Methacrylic acid | | 3 | | | | 10 | | |
| Acrylonitrile | | | | | 5 | | 5 | 5 |
| Mw | 9,500 | 9,300 | 9,700 | 37,500 | 10,200 | 11,000 | 10,100 | 36,800 |
| Mw/Mn | 2.1 | 2.0 | 2.1 | 3.5 | 2.2 | 2.3 | 2.2 | 2.8 |

2. Preparation of Wax
(Examples of Preparation of Pentaerythritol Tetrabehenate)

To a 2 L 4 necked flask equipped with a thermometer, a nitrogen introduction pipe, a stirring blade and a cooling pipe, pentaerythritol (60 g, 0.43 mol), behenic acid (612 g, 1.80 mol) was added, and the mixture was reacted under a nitrogen stream at 220° C. for 22 hours. The resulting crude ester product was 635 g and had an acid value of 8.9 mgKOH/g.

To the crude ester product, 130 g of toluene and 67 g of 2-propanol were added, and a 10% by mass potassium hydroxide aqueous solution which includes potassium hydroxide amounting to 2.0 times the equivalent of the residual acid value of the crude ester product was added, and the mixture was stirred at 70° C. for 30 minutes. After stirring, it was allowed to stand for 30 minutes to separate and remove the aqueous layer portion. The washing with water was repeated four times until the pH of the wastewater became neutral. The solvent of the remaining ester layer was distilled off under reduced pressure of 1 kPa at 180° C., and filtration was performed to obtain 540 g of pentaerythritol tetrabehenate. The yield relative to the crude ester product subjected to purification was 85%.

The obtained pentaerythritol tetrabehenate had an acid value of 0.2 mgKOH/g, a hydroxyl value of 3.2 mgKOH/g, and a transparent melting point measured by MP80 manufactured by Methler-Toledo Co., Ltd., of 82° C.

(Examples of Preparation of Behenyl Behenate)

To a 2 L 4 necked flask equipped with a thermometer, a nitrogen introduction pipe, a stirring blade and a cooling pipe, behenyl alcohol (300 g, 0.94 mol) and behenic acid (337 g, 0.99 mol) were added, and the mixture was reacted under a nitrogen stream at 220° C. for 18 hours. The resulting crude ester product was 604 g and had an acid value of 6.7 mgKOH/g.

62 g of toluene and 49 g of 2-propanol were charged into the crude ester product, and a 10% by mass potassium hydroxide aqueous solution which includes potassium hydroxide amounting to 2.0 times the equivalent of the residual acid value of the crude ester product was added, and the mixture was stirred at 70° C. for 30 minutes. After stirring, it was allowed to stand for 30 minutes to separate and remove the aqueous layer portion. The washing with water was repeated four times until the pH of the wastewater became neutral. The solvent of the remaining ester layer was distilled off under reduced pressure of 1 kPa at 180° C., and filtration was performed to obtain 550 g of behenyl behenate. The yield relative to the crude ester product subjected to purification was 91%.

The obtained behenyl behenate had an acid value of 0.2 mgKOH/g, a hydroxyl value of 2.6 mgKOH/g, and a transparent melting point measured in the same manner as described above of 71° C.

(Hydrocarbon Wax)

A Fischer-Tropsch wax, SASOL C80 (product name, manufactured by Sasol), was used.

3. Evaluation of the Thermoplastic Resin Composition
(1) Preparation of Thermoplastic Resin Composition
(a) Melt-Kneading of Polyester Resin Compositions (Examples 1, 3-9, Comparative Examples 1-4)

The compounding composition of the material in each experimental example is shown in Table 2. A polyester resin (product name FC-2470, manufactured by Mitsubishi Rayon Co., Ltd.), a wax and a wax dispersant were kneaded using LABO-PLASTOMILL (model: 4C150-01, manufactured by Toyo Seiki Seisakusho Co., Ltd.) in conditions of temperature of 120° C., rotation speed of 60 rpm, and kneading time of 5 minutes to obtain a sample of a thermoplastic resin composition.

(b) Melt-Kneading of Styrene Acrylic Resin Composition (Example 2)

The compounding composition of the material in each experimental example is shown in Table 2. A styrene acrylic resin (product name: DIANAL FB-1157, manufactured by Mitsubishi Rayon Co., Ltd.), a wax and a wax dispersant were kneaded using LABO-PLASTOMILL (model: 4C150-01, manufactured by Toyo Seiki Seisakusho Co., Ltd.) under conditions of temperature of 120° C., rotation speed of 60 rpm, and kneading time of 5 minutes to obtain a sample of a thermoplastic resin composition.

(2) Evaluation Method
(a) Evaluation of Dispersibility

A sample of the thermoplastic resin composition was subjected to a process of aligning a section surface using a glass knife, and cut out with a diamond knife using an ultramicrotome (Model: UC7, manufactured by Leica corporation) to produce an ultrathin slice having a thickness of 80 nm or less. The ultrathin slice floating on the water surface was recovered with an eyelash probe onto a grid mesh for TEM observation, and then used as an observation sample on a transmission electron microscopy (TEM; model: JEM-1300, manufactured by JEOL Co., Ltd.).

Dispersed particles of the wax were selected at 10 points in a field of view at 1000× magnification, and the diameters of the major axis and the minor axis of each dispersed particle were measured. The average value of the major axis diameter and the minor axis diameter was determined as the dispersed particle size. The average value of the dispersed particle sizes measured at 10 points was defined as the average dispersed particle size and used as an index of wax dispersibility. The smaller the value of the average dispersed particle size of the dispersed wax particles, the better the dispersibility of the wax.

The samples were evaluated: as Very Good (⊚), if the average dispersed particle size is less than 90 μm; as Good (○). if the average dispersed particle size is 90 μm or more and less than 110 μm; as Slightly Bad (Δ), if the average dispersed particle size is 110 μm or more and less than 130 μm; and, as Bad (x), if the average dispersed particle size is more than 130 μm.

(b) Evaluation of Transparency A sample of the thermoplastic resin composition was molded into a flat plate sheet having a thickness of 1 mm by thermal pressing. The haze of the obtained sheet-like samples was measured in accordance with JIS-K7136 using a spectroscopic haze meter (Model: HSP-150VIR, manufactured by Murakami Color Research Laboratory). The smaller the haze (%) value, the better the transparency.

The samples were evaluated: as Good (○), if the haze is less than 20%; as Slightly Bad (Δ), if the haze is 20% or more and less than 25%; and, as Bad (x), if the haze is more than 25%.

(c) Evaluation of Fluidity

Melt flow rate (MFR, unit: g/10 min) was measured for samples of thermoplastic compositions, by five times, in accordance with the method specified in JIS K7210-1, using a model: F-F01 manufactured by Toyo Seiki Seisakusho Co., Ltd. as a device, at a load of 21.18N and a temperature of 150° C., and the mean value was determined as the MFR value. The larger the value, the greater the fluidity.

The samples were evaluated: as Very Good (◉), if MFR is 5.0 or more and less than 15.0; as Good (○), if MFR is 3.5 or more and less than 5.0; as Slightly Bad (Δ), if MFR is 1.0 or more and less than 3.5: and, as Bad (x), if MFR is less than 1.0.

(d) Evaluation of Storage Stability

A sample of the thermoplastic resin composition was subjected to mechanical grinding and passed through a sieve having an opening of 75 μm, and the obtained preparation was used as a test sample. 5 g of the test sample was placed in a 50 ml glass bottle, and stored at a temperature of 55° C./humidity of 30% for 12 hours, and the degree of aggregation was visually observed. Those in which the particles were not agglomerated were evaluated as Good (○), those in which they were partially agglomerated were evaluated as Slightly Good (Δ), and those in which they were agglomerated were evaluated as Bad (x).

(3) Evaluation Results

The blending composition and evaluation results of the thermoplastic resin composition are shown in Table 2.

TABLE 2

|  | Example 1 | Example 2 | Example 3 | Example 4 | Example 5 | Example 6 | Example 7 | Example 8 | Example 9 |
|---|---|---|---|---|---|---|---|---|---|
| Compounding Composition [mass %] | | | | | | | | | |
| Thermoplastic Resin | | | | | | | | | |
| Polystyrene Resin | 95.5 | | 95.5 | 95.5 | 95.5 | 95.5 | 95.5 | 95.0 | 95.5 |
| Styrene Acrylic Resin | | 95.5 | | | | | | | |
| Wax | | | | | | | | | |
| Behenyl Behenate | 3.0 | 3.0 | | | 3.0 | 3.0 | 3.0 | 3.0 | 3.0 |
| Pentaerythritol Tetrabehenate | | | 3.0 | | | | | | |
| Hydrocarbon Wax | | | | 3.0 | | | | | |
| Wax Dispersant | | | | | | | | | |
| P1 | 1.5 | 1.5 | 1.5 | 1.5 | | | | | |
| P2 | | | | | 1.5 | | | | |
| P3 | | | | | | 1.5 | | | |
| P4 | | | | | | | 1.5 | | |
| P5 | | | | | | | | 2.0 | |
| P6 | | | | | | | | | 1.5 |
| P7 | | | | | | | | | |
| P8 | | | | | | | | | |
| Evaluation Result | | | | | | | | | |
| Average Dispersed Particle Size [μm] | 75 ◉ | 54 ◉ | 79 ◉ | 80 ◉ | 85 ◉ | 96 ○ | 107 ○ | 82 ◉ | 93 ○ |
| Transparency [haze %] | 17 ○ | 14 ○ | 17 ○ | 17 ○ | 17 ○ | 17 ○ | 18 ○ | 17 ○ | 17 ○ |
| Fluidity [MFR, g/10 minutes] | 5.5 ◉ | 7.8 ◉ | 5.0 ◉ | 4.4 ○ | 4.4 ○ | 4.1 ○ | 3.7 ○ | 4.3 ○ | 3.6 ○ |
| Storage Stability | ○ | ○ | ○ | ○ | ○ | ○ | ○ | ○ | ○ |

|  | Comparative Example 1 | Comparative Example 2 | Comparative Example 3 | Comparative Example 4 |
|---|---|---|---|---|
| Compounding Composition [mass %] | | | | |
| Thermoplastic Resin | | | | |
| Polystyrene Resin | 97.0 | 95.5 | 94.0 | 94.0 |
| Styrene Acrylic Resin | | | | |
| Wax | | | | |
| Behenyl Behenate | 3.0 | 3.0 | 3.0 | 3.0 |
| Pentaerythritol Tetrabehenate | | | | |
| Hydrocarbon Wax | | | | |
| Wax Dispersant | | | | |
| P1 | | | | |
| P2 | | | | |
| P3 | | | | |
| P4 | | | | |
| P5 | | | | |
| P6 | | | | |
| P7 | | 1.5 | 3.0 | |
| P8 | | | | 3.0 |

TABLE 2-continued

| | Evaluation Result | | | |
|---|---|---|---|---|
| Average Dispersed Particle Size [μm] | 200 | 173 | 1.13 | 121 |
| | x | x | Δ | Δ |
| Transparency [haze %] | 25 | 21 | 20 | 22 |
| | x | Δ | Δ | Δ |
| Fluidity [MFR, g/10 minutes] | 0.9 | 2.3 | 3.4 | 2.8 |
| | x | Δ | Δ | Δ |
| Storage Stability | x | Δ | ○ | ○ |

The thermoplastic resin composition of Comparative Example 1 contains a polyester resin as the thermoplastic resin and behenyl behenate as the wax, but does not contain the wax dispersant.

The average dispersed particle size of the wax was 200 μm to evaluate the dispersibility as Bad, the haze was 25% to evaluate the transparency as Bad, the melt flow rate was 0.9 g/10 min to evaluate the fluidity as Bad, and the storage stability by observation of an aggregated state was evaluated as Bad. Comparative Example 1 was evaluated as Bad in all viewpoints.

The thermoplastic resin composition of Comparative Example 2 contains a polyester resin as the thermoplastic resin, behenyl behenate as the wax, and a copolymer P7 as the wax dispersant. The copolymer P7 is the wax-dispersant corresponding to Comparative Examples.

The average dispersed particle size of the wax was 173 μm to evaluate the dispersibility as Bad, the haze was 21% to evaluate the transparency as Slightly Bad, the melt flow rate was 2.3 g/10 min to evaluate the fluidity as Slightly Bad, and the storage stability by observation of the aggregation state was evaluated as Slightly Good. The dispersibility of the wax was slightly improved in Comparative Example 2 as compared with Comparative Example 1 However, Comparative Example 2 was evaluated as Bad or Slightly Bad for dispersibility, transparency and fluidity, and the effect of imparting wax dispersibility was insufficient.

The thermoplastic resin composition of Comparative Example 3 contains a polyester resin as the thermoplastic resin, behenyl behenate as the wax, and a copolymer P7 as the wax dispersant in a two times amount of the copolymer P7 in Comparative Example 2. As described above, the copolymer P7 is a wax-dispersant corresponding to Comparative Examples.

The average dispersed particle size of the wax was 113 μm to evaluate the dispersibility as Slightly Bad, the haze was 20% to evaluate the transparency as Slightly Bad, the melt flow rate was 3.4 g/10 min to evaluate the fluidity was Slightly Bad, and the storage stability by observation of the aggregation state was evaluated as Good. Since Comparative Example 3 used a large amount of the same wax dispersant as Comparative Example 2, the dispersibility of the wax was slightly improved as compared with Comparative Example 2. However, it was evaluated as Slightly Bad in dispersibility, transparency and fluidity, and the effect of imparting wax dispersibility was insufficient.

The thermoplastic resin composition of Comparative Example 4 contains a polyester resin as the thermoplastic resin, behenyl behenate as the wax, and a copolymer P8 as the wax dispersant. The copolymer P8 is a wax-dispersant corresponding to Comparative Examples. The content of the copolymer P8 in Comparative Example 4 is the same as that of the copolymer P7 in Comparative Example 3, and is relatively large.

The average dispersed particle size of the wax was 121 μm to evaluate the dispersibility as slightly Bad, the haze was 22% to evaluate the transparency as slightly Bad, the melt flow rate was 2.8 g/10 min to evaluate the fluidity was slightly Bad, and the storage stability by observation of the aggregation state was evaluated as Good. The dispersibility of the wax was slightly improved in Comparative Example 4 as compared with Comparative Example 1 However, Comparative Example 4 was evaluated as slightly Bad in dispersibility, transparency and fluidity, and the effect of imparting wax dispersibility was insufficient.

On the other hand, Examples 1 to 9 contain either a polyester resin or a styrene acrylic resin as the thermoplastic resin, any one of behenyl behenate, pentaerythritol tetrabehenate and a hydrocarbon wax as the wax, and any one of copolymers P1 to P6 as the wax dispersant. The content of the copolymer as the wax dispersant is 1.5% by mass or 2% by mass.

It was confirmed that Examples 1 to 9 had an average dispersed particle size of wax of less than 110 μm that means the wax was finely dispersed. For the transparency, the haze was less than 20% that means the transparency was Good. For the fluidity, MFR was 3.5 g/10 min or more that means the fluidity was Good. For the storage stability, it was confirmed that the pulverized particles did not aggregate, the reason was presumed that the wax hardly migrated to the surface of the thermoplastic resin composition.

From the above results, Examples 1-9 were evaluated as Good or Very Good in all the viewpoints of dispersibility, transparency, fluidity and storage stability.

Among Examples, Examples 1-5 used the copolymer P1 or P2 as the wax-dispersant. The copolymers P1 and P2 use, as the (meth)acrylic acid alkyl ester (A3), the monomer (a3-1) in which $R^3$ is hydrogen atom and the monomer (a3-2) in which $R^8$ is methyl group. As a result, Examples 1-5 had the MFR of 4.4 or more and it was Good.

The copolymer P1 has a ratio of the monomer (a3-1) of about 71% by mass [=5/(5+2)] with respect to the total amount of the monomer (a3-1) and the monomer (a3-2) in the monomer (A3). On the other hand, the copolymer P2 has a ratio the same defined of 50% by mass [=5/(5+5)].

Since the copolymer P1 falls within a more preferable range in comparison with the copolymer P2, in a point of the ratio of the monomer (a3-1) with respect to the total amount of the monomer (a3-1) and the monomer (a3-2), Example 1 using the copolymer P1 has an improved MFR as compared with Example 5 which is the same as Example 1 except that the copolymer P2 is used.

The copolymer P3 and the copolymer P4 have the same monomer composition but different weight average molecular weights. The weight average molecular weight of the copolymer P3 is 9,700, and the weight average molecular weight of the copolymer P4 is 37,500.

Since the copolymer P3 falls within a more preferable range in comparison with the copolymer P4, in a point of the weight average molecular weight, Example 6 using the copolymer P3 has a slightly improved dispersibility as compared with Example 7 which is the same as Example 1 except that the copolymer P4 is used.

The invention claimed is:

1. A wax dispersant, which is a copolymer (A) having a copolymerization composition comprising a structural unit derived from an aromatic monomer (A1) within a range of 40 to 94% by mass, a structural unit derived from a (meth)acrylic acid long chain alkyl ester (A2) represented by the following general formula (1) within a range of 5 to 40% by mass, and a structural unit derived from a (meth)acrylic acid alkyl ester (A3) represented by the following general formula (2) within a range of 1 to 20% by mass on the basis of mass of monomers before polymerization, and having a weight average molecular weight within a range of 3,000 to 50,000, wherein General Formula (1)

wherein in the general formula (1), $R^1$ is a hydrogen atom or a methyl group, and $R^2$ is an alkyl group having 9 to 22 carbon atoms, and General Formula (2)

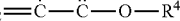

wherein in the general formula (2), $R^3$ is a hydrogen atom or a methyl group, and $R^4$ is an alkyl group having 1 to 8 carbon atoms.

2. The wax dispersant according to claim 1, wherein the structural unit derived from the (meth)acrylic acid alkyl ester (A3) of the copolymer (A) contains the structural unit derived from a monomer (a3-1) represented by the general formula (2) in which $R^3$ is a hydrogen atom and a monomer (a3-2) represented by the general formula (2) in which $R^3$ is a methyl group in combination with a ratio of the structural unit derived from the monomer (a3-1) with respect to the total amount of the structural units derived from the monomer (a3-1) and the monomer (a3-2) in a range of 50 to 90% by mass, on the basis of mass of monomers before polymerization.

3. The wax dispersant according to claim 1, wherein the copolymer (A) has the weight average molecular weight within a range of 4,000 to 30,000.

4. A thermoplastic resin composition comprising the wax dispersant defined by claim 1, a thermoplastic resin and a wax.

5. The thermoplastic resin composition according to claim 4 wherein the structural unit derived from the (meth)acrylic acid alkyl ester (A3) of the copolymer (A) in the wax dispersion contains the structural unit derived from a monomer (a3-1) represented by the general formula (2) in which $R^3$ is a hydrogen atom and a monomer (a3-2) represented by the general formula (2) in which $R^3$ is a methyl group in combination with a ratio of the structural unit derived from the monomer (a3-1) with respect to the total amount of the structural units derived from the monomer (a3-1) and the monomer (a3-2) in a range of 50 to 90% by mass, on the basis of mass of monomers before polymerization.

6. The thermoplastic resin composition according to claim 4 wherein the copolymer (A) in the wax dispersion has the weight average molecular weight within a range of 4.000 to 30,000.

7. A method for producing a thermoplastic resin composition, comprising:
providing a copolymer (A) for a wax dispersant, and
mixing the copolymer (A) with a thermoplastic resin,
wherein the copolymer (A) has a copolymerization composition comprising a structural unit derived from an aromatic monomer (A1) within a range of 40 to 94% by mass, a structural unit derived from a (meth)acrylic acid long chain alkyl ester (A2) represented by the following general formula (1) within a range of 5 to 40% by mass, and a structural unit derived from a (meth)acrylic acid alkyl ester (A3) represented by the following general formula (2) within a range of 1 to 20% by mass on the basis of mass of monomers before polymerization, and having a weight average molecular weight within a range of 3,000 to 50,000, wherein General Formula (1)

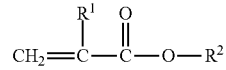

wherein in the general formula (1), $R^1$ is a hydrogen atom or a methyl group, and $R^2$ is an alkyl group having 9 to 22 carbon atoms, and General Formula (2)

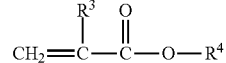

wherein in the general formula (2), $R^3$ is a hydrogen atom or a methyl group, and $R^4$ is an alkyl group having 1 to 8 carbon atoms.

8. The method according to claim 7, wherein the structural unit derived from the (meth)acrylic acid alkyl ester (A3) of the copolymer (A) contains the structural unit derived from a monomer (a3-1) represented by the general formula (2) in which $R^3$ is a hydrogen atom and a monomer (a3-2) represented by the general formula (2) in which $R^3$ is a methyl group in combination with a ratio of the structural unit derived from the monomer (a3-1) with respect to the total amount of the structural units derived from the monomer (a3-1) and the monomer (a3-2) in a range of 50 to 90% by mass, on the basis of mass of monomers before polymerization.

9. The method according to claim 7, wherein the copolymer (A) has the weight average molecular weight within a range of 4,000 to 30,000.

10. The method according to claim 7, wherein the copolymer (A) is further mixed with a wax.

* * * * *